United States Patent
Lee et al.

(10) Patent No.: US 10,762,242 B2
(45) Date of Patent: Sep. 1, 2020

(54) ELECTRONIC APPARATUS AND METHOD OF OPERATING THE SAME

(71) Applicant: SAMSUNG ELECTRONICS CO., LTD., Suwon-si, Gyeonggi-do (KR)

(72) Inventors: Sang-sup Lee, Seongnam-si (KR); Ji-soon Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 125 days.

(21) Appl. No.: 15/836,195

(22) Filed: Dec. 8, 2017

(65) Prior Publication Data
US 2018/0173901 A1 Jun. 21, 2018

(30) Foreign Application Priority Data
Dec. 15, 2016 (KR) .................. 10-2016-0171672

(51) Int. Cl.
| | | |
|---|---|---|
| H04N 5/445 | (2011.01) | |
| G06F 21/74 | (2013.01) | |
| G06F 12/14 | (2006.01) | |
| G06F 21/83 | (2013.01) | |
| G06F 21/81 | (2013.01) | |

(52) U.S. Cl.
CPC .......... *G06F 21/74* (2013.01); *G06F 12/145* (2013.01); *G06F 21/81* (2013.01); *G06F 21/83* (2013.01)

(58) Field of Classification Search
CPC ........ G06F 12/145; G06F 21/81; G06F 21/83; H04N 2005/44586; H04N 5/44513
See application file for complete search history.

(56) References Cited

U.S. PATENT DOCUMENTS

| | | |
|---|---|---|
| 8,375,221 B1 | 2/2013 | Thom et al. |
| 9,361,246 B2 | 6/2016 | Park et al. |
| 2014/0075178 A1* | 3/2014 | Trethewey ............ G06F 1/3206 713/100 |
| 2016/0332082 A1* | 11/2016 | Tsuchiya ................. A63F 13/79 |

FOREIGN PATENT DOCUMENTS

| | | |
|---|---|---|
| KR | 10-0979100 | 8/2010 |
| KR | 10-2014-0054003 | 5/2014 |
| KR | 10-1586562 | 1/2016 |

* cited by examiner

*Primary Examiner* — Olugbenga O Idowu
(74) *Attorney, Agent, or Firm* — Nixon & Vanderhye P.C.

(57) ABSTRACT

A method and system for operating an electronic apparatus includes: implementing, by a first processor, a main process of the electronic apparatus; receiving a user input for controlling an operation of at least one element (e.g., camera, memory, microphone, or the like) configured to perform at least one function; and in response to a received user input, controlling power of the at least one element by using at least a second processor separate from the first processor.

13 Claims, 6 Drawing Sheets

ELECTRONIC APPARATUS AND METHOD OF OPERATING THE SAME

CROSS-REFERENCE TO RELATED APPLICATION

This application is based on and claims the benefit under 35 U.S.C. Section 119 of Korean Patent Application No. 10-2016-0171672, filed on Dec. 15, 2016, in the Korean Intellectual Property Office, the disclosure of which is incorporated herein in its entirety by reference.

BACKGROUND

1. Field

Example embodiments of the present disclosure relate to an electronic apparatus and/or a method of operating the same, and more particularly, to an electronic apparatus for controlling power of at least one element by using a first processor, which implements main processes of the electronic apparatus, and a separate second processor, and/or a method of operating the electronic apparatus.

2. Description of the Related Art

Along with recent developments in scientific technology, electronic apparatuses such as televisions (TVs), mobile phones, tablet personal computers (PCs), and laptops may provide a variety of functions. For example, such electronic apparatuses may capture images, record voice, and support payment services.

Since electronic apparatuses perform various functions, personal information of users may be stored in the electronic apparatuses or privacy-related operations may be performed by the electronic apparatuses. However, if hackers break into the electronic apparatuses, personal information stored therein may not remain secure.

SUMMARY

Provided are an electronic apparatus for controlling power of at least one element by using a first processor, which implements main processes of the electronic apparatus, and a separate second processor, in response to a user input received to control an operation of the at least one element, and a method of operating the electronic apparatus.

Additional aspects will be set forth in part in the description which follows and, in part, will be apparent from the description, or may be learned by practice of the presented embodiments.

According to an aspect of an embodiment, an electronic apparatus includes: a first processor configured to implement a main process of the electronic apparatus; at least one element configured to perform at least one function; and a second processor configured to control power of the at least one element, the second processor being separate from the first processor. The second processor is further configured to control the power of the at least one element in response to a received user input for controlling an operation of the at least one element.

According to an aspect of another embodiment, a method of operating an electronic apparatus, includes: executing, by a first processor, a main process of the electronic apparatus; receiving a user input for controlling an operation of at least one element configured to perform at least one function; and in response to a received user input, controlling power of the at least one element by using the first processor and a second processor separate from the first processor.

According to an aspect of an embodiment, a non-transitory computer-readable recording medium having recorded thereon a program which, when executed by a computer, performs the method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of", when preceding a list of elements, modify the entire list of elements and do not modify the individual elements of the list.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the disclosure.

It will be understood that although the terms "first", "second", etc. may be used herein to describe various components, these components should not be limited by these terms. These components are only used to distinguish one component from another.

The terms used in the present specification are merely used to describe particular embodiments, and are not intended to limit the present disclosure. An expression used in the singular encompasses the expression of the plural, unless it has a clearly different meaning in the context. It will be understood that when an element is referred to as being "connected to" another element, the element can be "directly connected to" the other element or "electrically connected thereto" with an intervening element therebetween. Also, throughout the specification, when a portion "includes" an element, another element may be further included, rather than excluding the existence of the other element, unless otherwise described.

The use of the terms "a" and "an" and "the" and similar referents in the context of describing the disclosure (especially in the context of the following claims) are to be construed to cover both the singular and the plural. When a certain embodiment may be implemented differently, a specific process order may be performed differently from the described order. For example, two consecutively described processes may be performed substantially at the same time or performed in an order opposite to the described order.

In the present specification, the expression such as "some embodiments" or "an embodiment" does not necessarily denote the same embodiment.

The present disclosure may be described in terms of functional block components and various processing steps. Such functional blocks may be realized by any number of hardware and/or software components configured to perform the specified functions. For example, functional block components herein may be realized by one or more microprocessors or circuit components which may carry out a variety of functions. Also, the functional block components herein may be implemented with any programming or scripting language. Functional block components may be implemented in algorithms that execute on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail by explaining exemplary embodiments of the disclosure with reference to the attached drawings.

Figure 1:
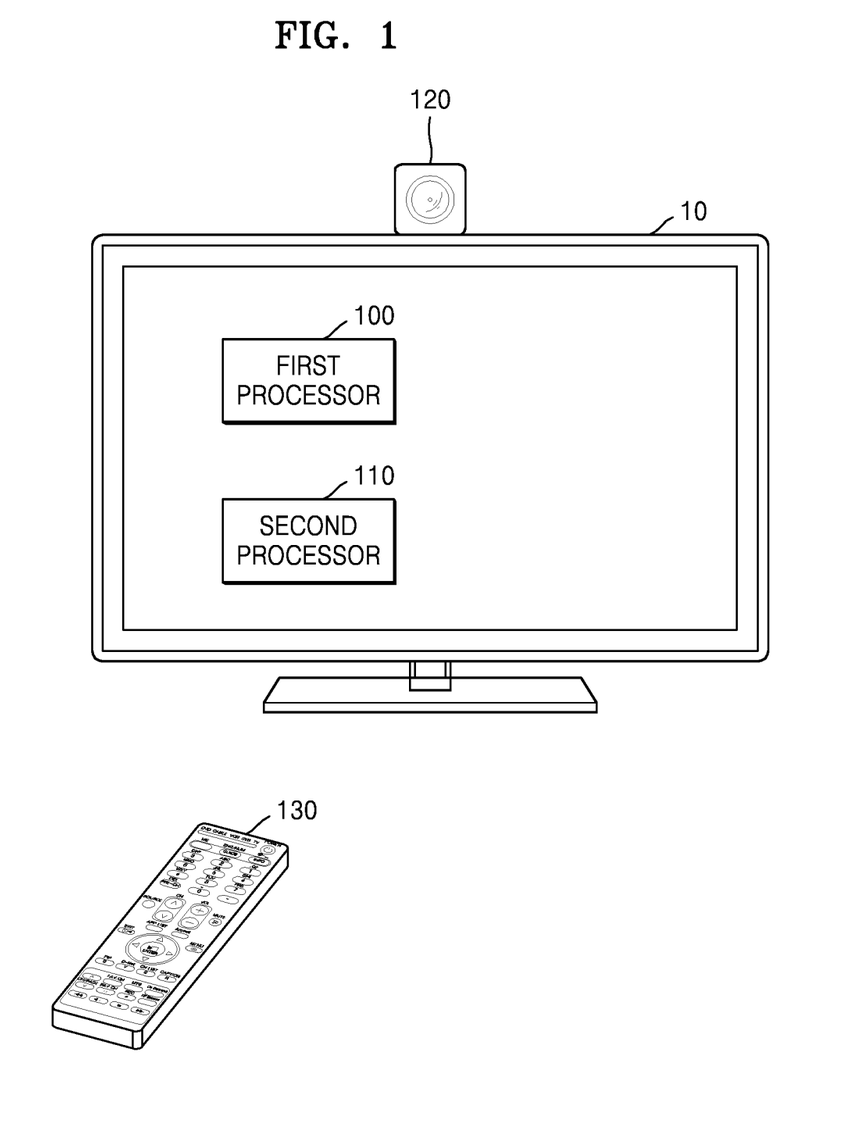
FIG. 1 is a diagram of an electronic apparatus for controlling power of at least one element by using a first processor implementing main processes of the electronic apparatus, and a second processor separate from the first processor, according to an embodiment.

FIG. 1 is a diagram of an electronic apparatus 10 for controlling power of one or more elements 120 by using a first processor 100 implementing main processes of the electronic apparatus 10, and a second processor 110 separate from the first processor 100, according to an embodiment.

Referring to FIG. 1, the electronic apparatus 10 according to an embodiment may be a television (TV), but this is merely an example. The electronic apparatus 10 may be realized as an electronic apparatus including a display, a microphone, and the like which may output a message regarding whether to control operations of the one or more electronic elements 120 included in the electronic apparatus 10. For example, the electronic apparatus 10 may be realized as any of electronic apparatuses such as a mobile phone, a tablet personal computer (PC), a digital camera, a camcorder, a laptop computer, a desktop computer, an e-book reader, a digital broadcast terminal, a personal digital assistant (PDA), a portable multimedia player (PMP), a navigation device, an MP3 player, and a wearable device. In particular, embodiments may be easily implemented by a display apparatus, e.g., a TV, which has a large display. However, the present disclosure is not limited thereto. The electronic apparatus 10 may be fixed to a certain place or may be portable and may be a digital broadcast receiver capable of receiving a digital broadcast.

The electronic apparatus 10 according to an embodiment may include the first processor 100, the one or more elements 120, and the second processor 110. The first processor 100 implements the main processes of the electronic apparatus 10, the element 120 performs at least one function, and the second processor 110 controls power of the one or more elements 120 as a separate unit.

The first processor 100 may implement the main processes of the electronic apparatus 10. For example, the first processor 100 may generally control all operations of the electronic apparatus 10. In particular, the first processor 100 may execute programs stored in a memory and thus may generally control a user input, an output, sensing, communications, an audio/video (NV) input, etc. in the electronic apparatus 10.

According to an embodiment, the first processor 100 may display, on a display of the electronic apparatus 10, a message regarding whether to control operations of the one or more elements 120.

The second processor 110 is a unit separate from the first processor 100 implementing the main processes of the electronic apparatus 10. The second processor 110 may control power of the one or more elements 120 included in the electronic apparatus 10. The second processor 110 according to an example embodiment is a unit physically separate from the first processor 100 and does not have any route used to share data with the first processor 100. When the second processor 110, which does not share data with the first processor 100, is allowed to control power of a certain element(s) (e.g., 120) and receives a preset user input, the second processor 110 turns on the certain element such that data associated with personal information processed by the certain element may be safely protected. In other words, when the electronic apparatus 10 is turned on and the first processor 100 operates in a normal mode, the certain element (e.g., 120) may keep being in an off state until the certain element receives a preset user input. Thus, even when the first processor 100 processes data, the certain element keeps being in the off state so that the data processed by the certain element may be protected from malicious attack or hacking. The certain element (e.g., 120) may be any of components included in the electronic apparatus 10, but may particularly include components such as a user input detector such as a camera or a microphone, a memory storing user's personal information or authentication information, or the like, which processes the data associated with the personal information.

For example, the second processor 110 may control the power of the one or more elements 120 in response to the user input for controlling the operations of the one or more elements 120, the user input being received by the electronic apparatus 10.

According to an embodiment, the second processor 110 may receive a user input corresponding to a message displayed on the display of the electronic apparatus 10 so as to inquire whether to control the operations of the one or more elements 120.

Also, according to an embodiment, when there is no data input/output for operating the one or more elements 120 having been in an on state for a certain period of time, the second processor 110 may turn off the one or more elements 120.

The electronic element 120 is a unit included in the electronic apparatus 10 and performing at least one function. The element 120 may be one or more of a user input unit, an output unit, a controller, a communicator, a sensor, an A/V input unit, or a memory included in the electronic apparatus 10. For example, the element 120 may be a camera and may obtain images or moving images by an image sensor. Also, for example, the electronic element 120 may be a microphone and may process a received external sound signal to convert it to electrical voice data. Also, for example, the element 120 may be a memory in which data for a certain purpose, for example, user authentication information, is stored.

A user input unit 130 may be a remote control device by which the user inputs data to control the electronic apparatus 10. For example, the user input unit 130 may be a key pad, a touch pad, a dome switch, a jog wheel, a jog switch, or the like, but is not limited thereto.

According to an embodiment, a user input for controlling operations of the one or more elements 120 may be a combination of inputs for operating the first processor 100, an input that is different from an existing input for operating the first processor 100 to control the operations of the one or more elements 120, or an input received from an external device.

Figure 2:
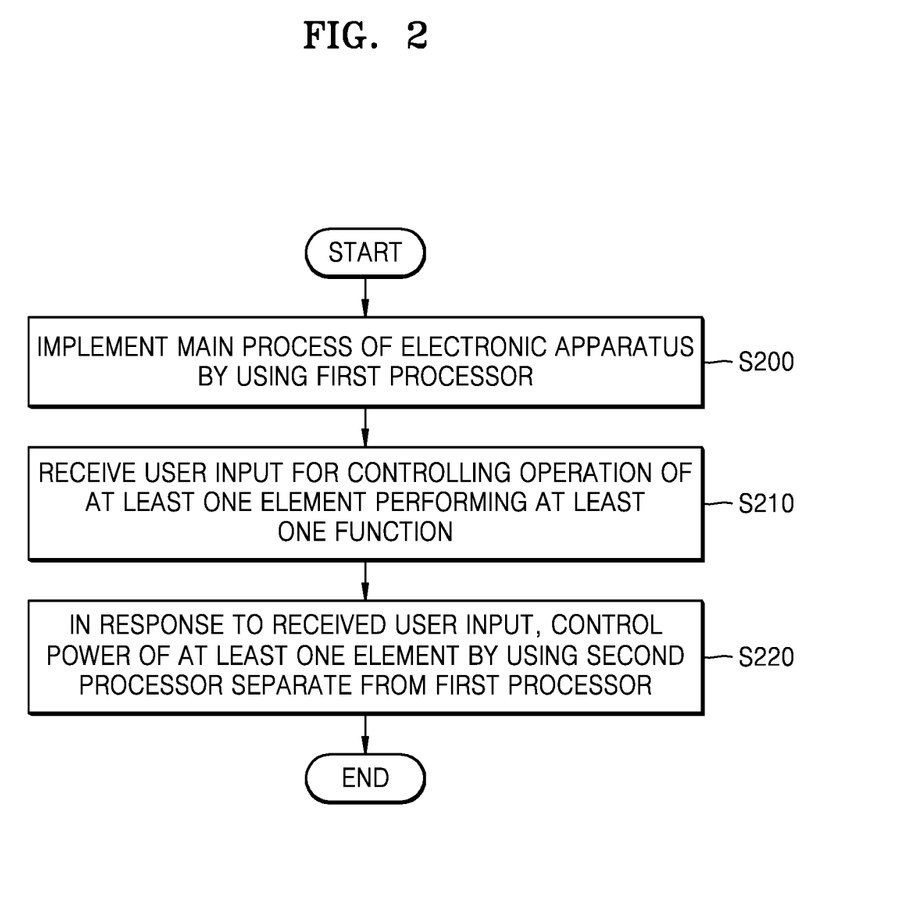
FIG. 2 is a flowchart of a method of operating an electronic apparatus for controlling power of at least one element by using a first processor implementing main processes of the electronic apparatus, and a second processor separate from the first processor, according to an embodiment.

FIG. 2 is a flowchart of a method of operating the electronic apparatus 10 for controlling power of the one or more elements 120 by using the first processor 100 for implementing the main processes of the electronic apparatus 10, and the second processor 110 separate from the first processor 100, according to an embodiment.

In operation S200, the first processor 100 of the electronic apparatus 10 may implement the main processes of the electronic apparatus 10.

The first processor 100 may implement the main processes of the electronic apparatus 10. For example, the first processor 100 may generally control all operations of the electronic apparatus 10 and may particularly execute programs stored in the memory, thereby controlling a user input, an output, sensing, communications, an AN input, etc. of the electronic apparatus 10 overall.

In operation S210, the electronic apparatus 10 may receive a user input for controlling operations of the element(s) 120 for performing one or more functions.

The user input may denote data that the user uses to control the electronic apparatus 10. For example, the user input may include one or more of a control signal from a remote control device, voice from an audio input device, a signal from an input device of the electronic apparatus 10, an input through a user interface displayed on the display, or the like. The remote control device (e.g., 130) may be, for example, a key pad, a touch pad, a dome switch, a jog wheel, a jog switch, a smart phone, or the like, but is not limited thereto.

Also, when a user input is received from the remote control device, the user input for controlling the operations of the one or more elements 120 may include a method of using, in a specific way, existing buttons or menus included in the remote control device. For example, the user input for controlling the operations of the one or more elements 120 may include an input made by pressing one of existing buttons included in the remote control device two times in a row.

Also, when a user input is received from the remote control device, the user input for controlling the operations of the one or more elements 120 may include an input made by pressing a certain button included in the remote control device. For example, the remote control device may include, other than the existing buttons, a new button used to control the operations of the one or more elements 120.

According to an embodiment, the user input for controlling the operations of the one or more elements 120 may be a combination of inputs for operating the first processor 100, an input that is different from an existing input for operating the first processor 100 to control the operations of the one or more elements 120, or an input received from an external device.

According to an embodiment, the first processor 100 and/or the second processor 110 may receive the user input for controlling the operations of the one or more elements 120 that perform one or more functions.

According to an embodiment, the electronic apparatus 10 may display, on the display, the message regarding whether to control the operations of the one or more elements 120 and may receive a user input corresponding to the displayed message. Also, according to an embodiment, the first processor 100 may display, on the display, a message regarding whether to control the operations of the one or more elements 120, and the second processor 110 may receive a user input corresponding to the displayed message.

In operation S220, the electronic apparatus 10 may respond to the user input received in operation S210, and the first and/or second processors 100 and 110 may control the power of the one or more elements 120.

The second processor 110 is a unit separate from the first processor 100 that implements the main processes of the electronic apparatus 10. The second processor 110 may control the power of the one or more elements 120 included in the electronic apparatus 10. The second processor 110 according to an embodiment is a unit physically separate from the first processor 100 and does not have a route through which data is shared with the first processor 100. For example, the second processor 110 may control the power of the one or more elements 120 in response to the user input for controlling the operations of the one or more elements 120, the user input being received by the electronic apparatus 10.

According to an embodiment, when there is no data input/output for operating the one or more elements 120 having been in an on state, for a certain period of time, the second processor 110 may turn off the one or more elements 120.

Figure 3:
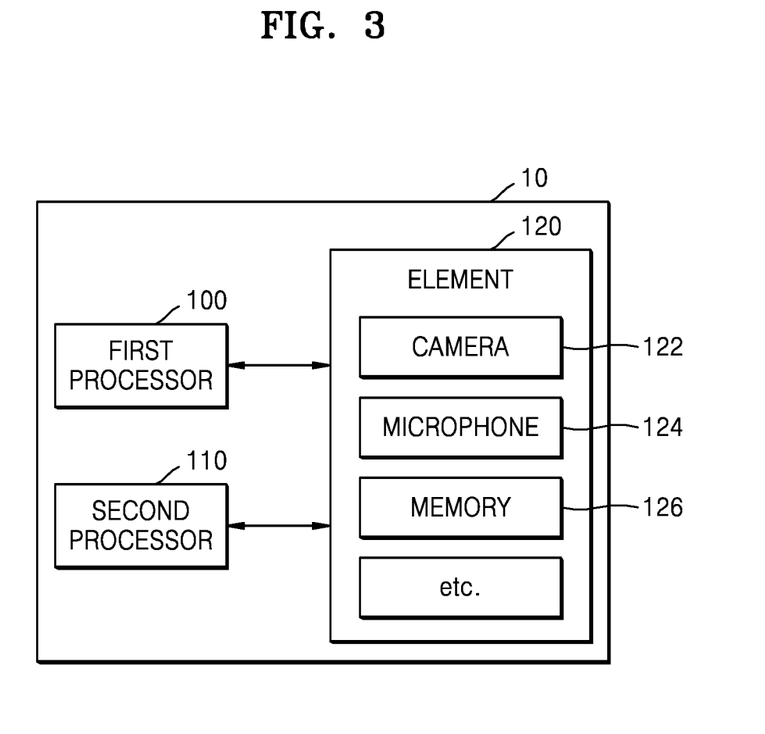
FIGS. 3 and 4 are block diagrams of a structure of an electronic apparatus for controlling power of at least one element by using a first processor implementing main processes of the electronic apparatus, and a second processor separate from the first processor, according to an embodiment.
Figure 4:
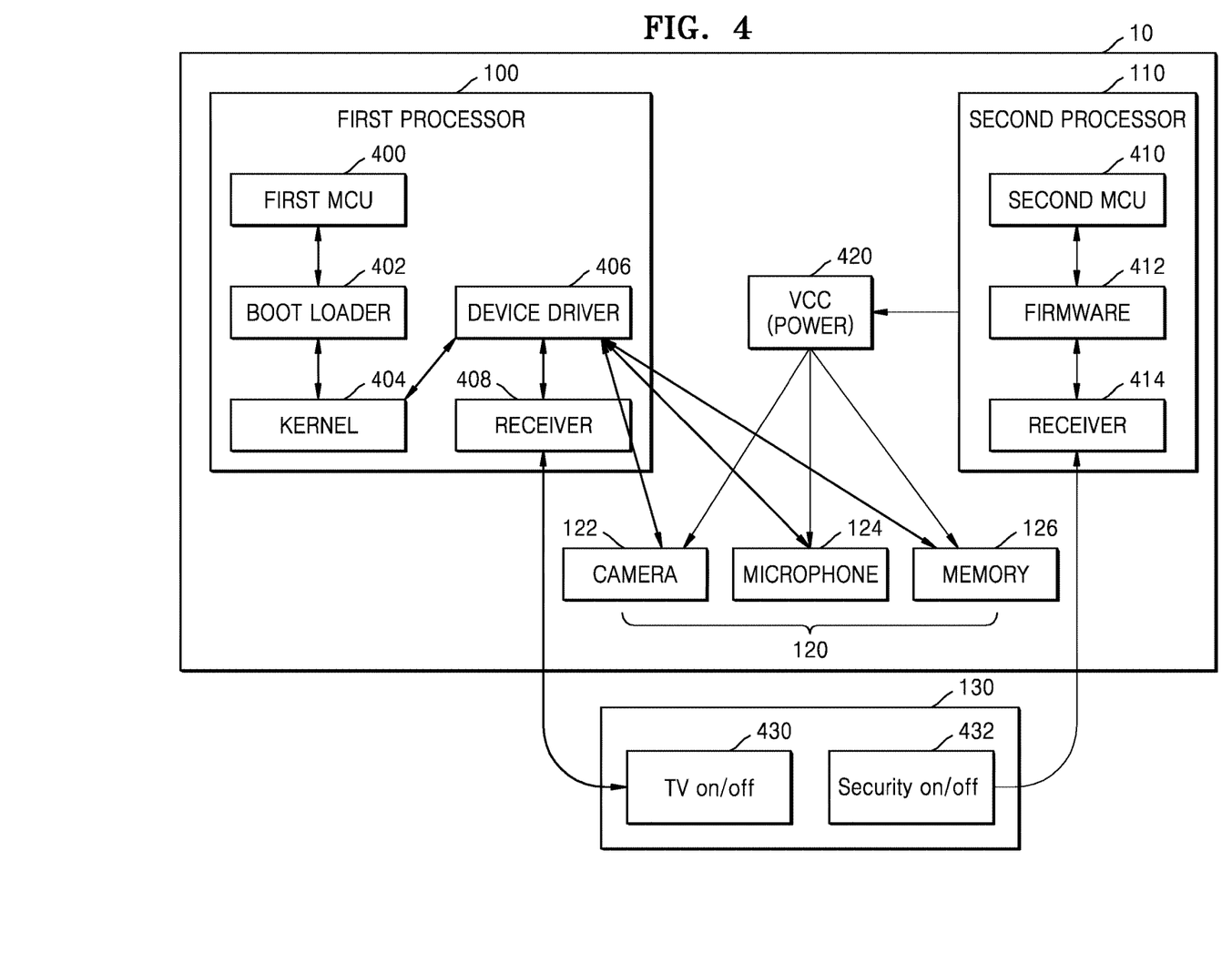

FIGS. 3 and 4 are block diagrams of a structure of the electronic apparatus 10 for controlling power of the one or more elements 120 by using the first processor 100 for implementing the main processes of the electronic apparatus 10, and the second processor 110 separate from the first processor 100, according to an example embodiment.

Referring to FIG. 3, the electronic apparatus 10 according to an embodiment may include the first processor 100, the second processor 110, and the element 120. However, the components shown in FIG. 3 may not always be necessary. The electronic apparatus 10 may be realized by more or less components than the components shown in FIG. 3.

The first processor 100 may implement the main processes of the electronic apparatus 10. For example, the first processor 100 may generally control all operations of the electronic apparatus 10. In particular, the first processor 100 may execute the programs stored in the memory and may thus control a user input, an output, sensing, communications, an A/V input, etc. of the electronic apparatus 10 overall.

The second processor 110 is a unit separate from the first processor 100 that implements the main processes of the electronic apparatus 10. The second processor 110 may control the power of the one or more elements 120 included in the electronic apparatus 10. For example, the second processor 110 may control the power of the one or more elements 120 in response to the user input for controlling the operations of the one or more elements 120, the user input being received by the electronic apparatus 10.

The element 120 is included in the electronic apparatus 10 and performs at least one function. The element 120 may be a user input unit, an output unit, a controller, a communicator, a sensor, an A/V input unit, or a memory which is included in the electronic apparatus 10. For example, the element 120 may be a camera 122 and may obtain an image or a moving image by using an image sensor. As another example, the element 120 may be a microphone 124 and may process a received external sound signal to convert it to electrical voice data. As another example, the element 120 may be a memory 126 for storing data for a specific purpose, for example, user authentication information.

Referring to FIG. 4, the electronic apparatus 10 may include the first processor 100 (including processing circuitry), the second processor (including processing circuitry) 110, and the element 120. In particular, the first processor 100 may include a first micro controller unit (MCU) 400, a boot loader 402, a kernel 404, a device driver 406, and a receiver 408. Also, the second processor 110 may include a second MCU 410, firmware 412, and a receiver 414. However, the components shown in FIG. 4 may not always be necessary, and the second processor 110 may be realized by more or less components than the components shown in FIG. 4.

Referring to FIG. 4, the user input may be received from an external device 130 such as a remote control of a TV, but is not limited thereto. Also, referring to FIG. 4, the user input may be an input (a TV on/off input) 430 for operating the first processor 100 and/or an input (a security on/off input) 432 for controlling the operations of the at least one element 120. However, the user input is not limited thereto.

Referring to FIG. 4, the second processor 110 may receive the user input for controlling the operation of the at least one element 120. Also, the second processor 110 may compare the received user input with a value that is stored in advance, and when the user input is determined to be authentic, an element 120 corresponding to the user input may be turned on.

Also, referring to FIG. 4, the first processor 100 may control operations of the element 120, other than the power control thereof.

Figure 5:
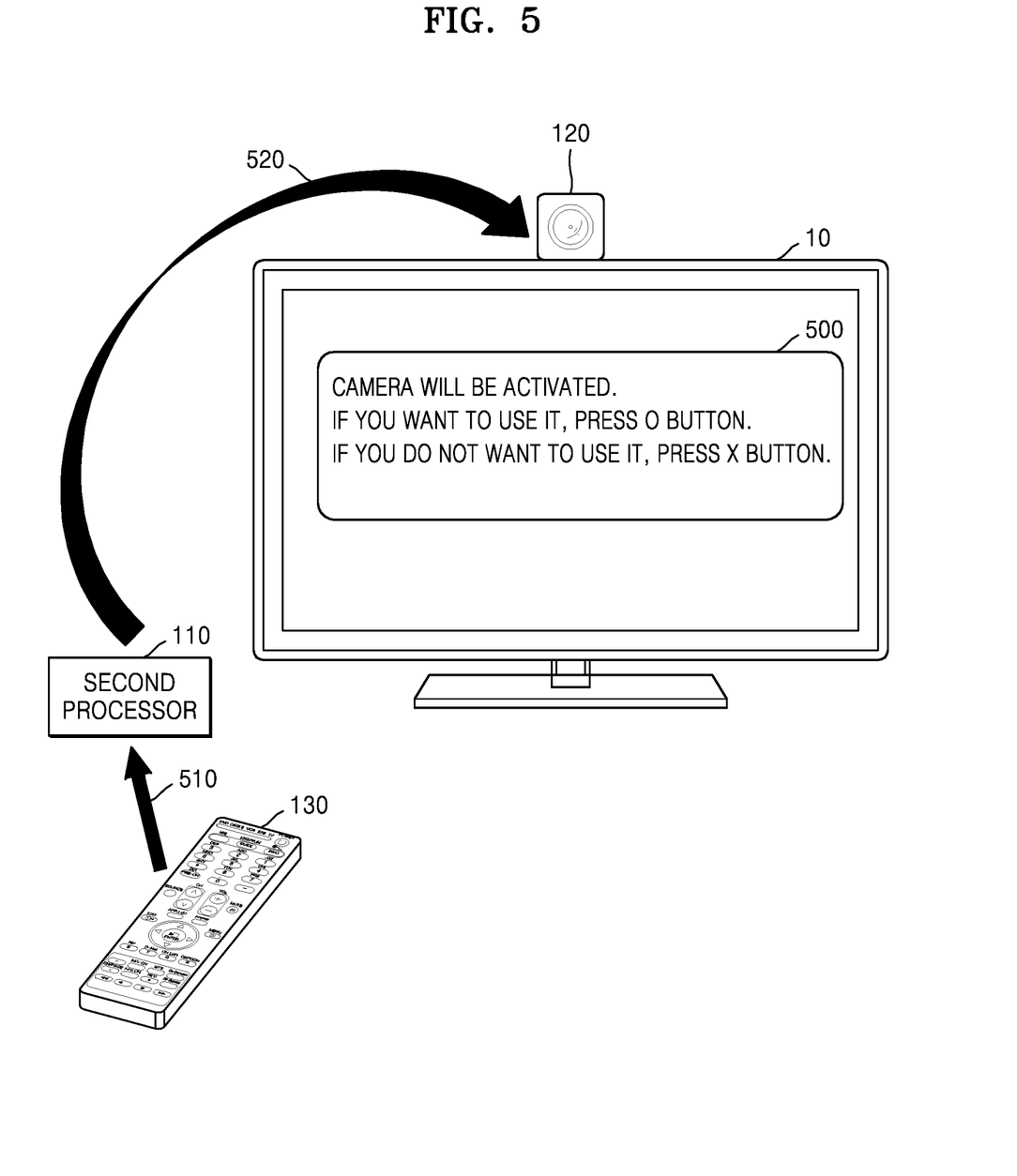
FIG. 5 is a diagram showing an example of controlling power of an element by a second processor, according to an embodiment.

FIG. 5 is a diagram showing an example of controlling power of an element 120 by using the second processor 110, according to an example embodiment.

Referring to FIG. 5, the electronic apparatus 10 may be a TV, and an element 120 that the user wants to use may be a camera included in the electronic apparatus 10, for example.

Also, referring to FIG. 5, when the user wants to use the camera attached to the TV, for example, when the user accesses a camera menu, the TV may display, on a display, a message 500 regarding whether to control an operation of the camera. When the user sends a user input 510 corresponding to the displayed message, the second processor 110 may compare the received user input with a value that is stored in advance, and when the user input 510 is determined to be authentic, the camera may be turned on by a control 520 of the second processor 110.

Figure 6:
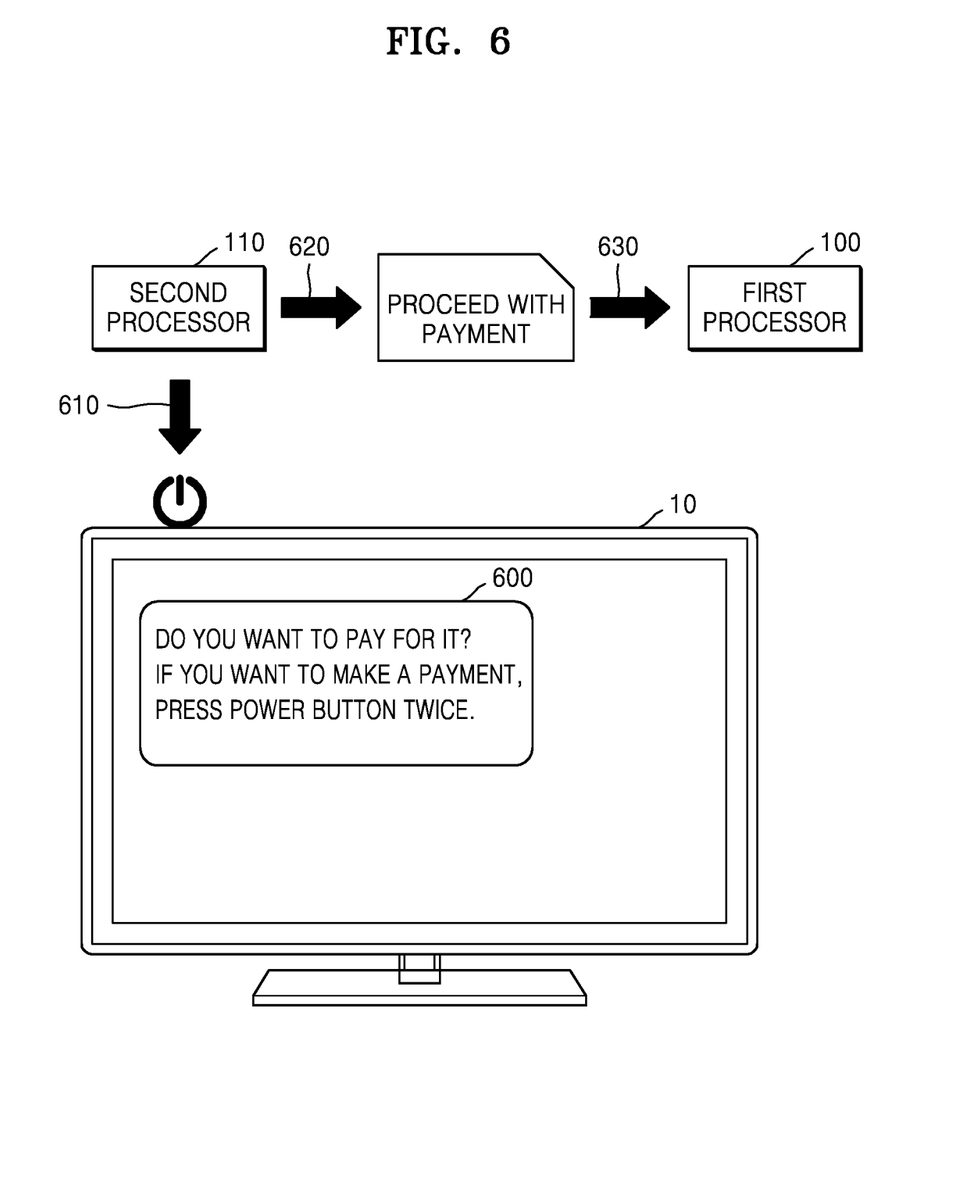
FIG. 6 is a diagram showing an example of controlling power of an element by a second processor, according to another embodiment.

FIG. 6 is a diagram showing an example of controlling power of an element by using the second processor 110, according to another embodiment.

Referring to FIG. 6, the electronic apparatus 10 may be a tablet PC/TV, and an element 120 that the user wants to use may be a memory included in the electronic apparatus 10 and storing therein user authentication information used to make a payment.

Referring to FIG. 6, when the user wants to make a payment on the tablet PC, the apparatus 10 may display, on the display, a message 600 regarding whether to control a payment process. When the user sends a user input corresponding to the displayed message 600, for example, when the user sends a user input 610 by pressing a power button twice, the second processor 110 may compare the received user input 610 with a value that is stored in advance, and when the user input is determined to be authentic, the second processor 110 may proceed with a payment 620 and may transmit a payment result 630 to the first processor 100.

The embodiments of the present disclosure can be written as computer programs and can be implemented in general-use digital computers that execute the programs using a non-transitory computer-readable recording medium. Data structures used in the above embodiments may be recorded in a non-transitory computer-readable recording medium in various manners. Also, the above embodiments may be implemented as non-transitory computer-readable recording medium including instructions executable by a computer such as a program module executed by a computer. For example, when software modules or algorithms are involved, these software modules may be stored as program instructions or computer-readable codes executable on a processor on a computer-readable medium.

The non-transitory computer-readable recording medium may be an arbitrary recording medium accessible by a computer and may include volatile and non-volatile media and removable and non-removable media. Examples of the non-transitory computer-readable recording medium include magnetic storage media (e.g., ROM, floppy disks, hard disks, etc.), optical recording media (e.g., CD-ROMs, or DVDs), etc. The non-transitory computer-readable recording medium may also include a computer storage medium and a communication medium.

The non-transitory computer-readable recording medium can also be distributed over network coupled computer systems so that the computer readable code is stored and executed in a distributive manner. This media can be read by the computer, stored in the memory, and executed by the processor.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail.

Although the above embodiments of the present disclosure have been shown and described, it would be appreciated by those of ordinary skill in the art that changes may be made in these exemplary embodiments without departing from the principles and spirit of the disclosure. Thus, the present disclosure should not be construed as being limited to the embodiments set forth herein. For example, a single component may be divided into different components, and components that are divided can be integrated into one component.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. The embodiments should be considered in descriptive sense only and not for purposes of limitation.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic apparatus comprising:
   a first processor configured to implement a main process of the electronic apparatus;
   at least one electronic element comprising circuitry configured to perform at least one function; and
   a second processor configured to control power of the at least one electronic element,
   wherein the second processor is physically separated from the first processor and does not have any route to share data with the first processor, and is further configured, when the first processor is controlling the main process of the electronic apparatus, to control the power of the at least one electronic element in response to a received user input for controlling an operation of the at least one electronic element.

2. The electronic apparatus of claim 1, wherein the first processor is further configured to control displaying, on a display, a message regarding whether to control the operation of the at least one element, and
   the second processor is configured to receive a user input corresponding to the displayed message.

3. The electronic apparatus of claim 1, wherein the at least one element comprises an image sensor, and
   the second processor is configured to control power of the image sensor in response to the received user input for controlling the operation of the at least one element.

4. The electronic apparatus of claim 1, wherein the at least one element comprises a memory configured to store data for a specific purpose,
   wherein the data comprises user authentication information, and
   wherein the second processor is configured to control power of the memory in response to the received user input for controlling the operation of the at least one element.

5. The electronic apparatus of claim 1, wherein the user input comprises at least one of: a combination of inputs for operating the first processor, an input different from the inputs and for controlling the operation of the at least one element, and an input received through an external device.

6. The electronic apparatus of claim 1, wherein, when there is no data input/output for operating the at least one element having been in an on state, for a certain period of time, the second processor is further configured to turn off the at least one element.

7. A method of operating an electronic apparatus, the method comprising:
   implementing, by a first processor, a main process of the electronic apparatus;
   receiving a user input for controlling an operation of at least one electronic element comprising circuitry configured to perform at least one function; and
   in response to a received user input, controlling power of the at least one electronic element by using a second processor separate from the first processor when the first processor is controlling the main process of the electronic apparatus, wherein the second processor is physically separated from the first processor and does not have any route to share data with the first processor.

8. The method of claim 7, wherein the first processor is configured to control displaying, on a display, a message regarding whether to control the operation of the at least one element, and
   the second processor is configured to receive a user input corresponding to the displayed message.

9. The method of claim 7, wherein the at least one element comprises an image sensor, and
   the controlling of the power comprises controlling power of the image sensor by using the first processor and the second processor, in response to the received user input.

10. The method of claim 7, wherein the at least one element comprises a memory configured to store data for a certain purpose,
    the data comprises user authentication information, and
    the controlling of the power comprises controlling power of the memory by using the first processor and the second processor, in response to the received user input.

11. The method of claim 7, wherein the user input comprises at least one of: a combination of inputs for operating the first processor, an input different from the inputs and for controlling the operation of the at least one element, and an input received through an external device.

12. The method of claim 7, wherein the second processor, when there is no data input/output for operating the at least one element having been in an on state, for a certain period of time, turns off the at least one element.

13. A non-transitory computer-readable recording medium having recorded thereon a program which, when executed by a computer, performs the method of claim 7.

* * * * *